(12) United States Patent
Luebbert et al.

(10) Patent No.: US 12,060,823 B2
(45) Date of Patent: Aug. 13, 2024

(54) METHOD FOR ADAPTING THE VOLUME FLOW

(71) Applicant: Vitesco Technologies GmbH, Regensburg (DE)

(72) Inventors: Tobias Luebbert, Cologne (DE); Peter Bauer, Bonn (DE); Cornelius Köhler, Hürth (DE); Youness Idar, Freyming-Merlebach (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/031,239

(22) PCT Filed: Oct. 5, 2021

(86) PCT No.: PCT/EP2021/077461
§ 371 (c)(1),
(2) Date: Apr. 11, 2023

(87) PCT Pub. No.: WO2022/078822
PCT Pub. Date: Apr. 21, 2022

(65) Prior Publication Data
US 2023/0383684 A1  Nov. 30, 2023

(30) Foreign Application Priority Data
Oct. 14, 2020 (DE) ...................... 10 2020 212 961.4

(51) Int. Cl.
*F01N 3/20* (2006.01)
(52) U.S. Cl.
CPC .............. *F01N 3/208* (2013.01); *F01N 3/206* (2013.01); *F01N 3/2066* (2013.01);
(Continued)

(58) Field of Classification Search
CPC combination set(s) only.
See application file for complete search history.

(56) References Cited

U.S. PATENT DOCUMENTS

| 5,411,002 A | 5/1995 | Smitley |
| 10,669,911 B2 * | 6/2020 | Lindahl ................ B01D 53/346 |

(Continued)

FOREIGN PATENT DOCUMENTS

| DE | 102008000092 | 8/2008 |
| DE | 102010000931 | 7/2011 |

(Continued)

OTHER PUBLICATIONS

Office Action of corresponding German Patent Application No. 10 2020 212 961.4.

*Primary Examiner* — Binh Q Tran
(74) *Attorney, Agent, or Firm* — Cozen O'Connor

(57) ABSTRACT

A method for operating a conveying device for an aqueous urea solution in a motor vehicle, having a pump for conveying the aqueous urea solution, wherein the aqueous urea solution is conveyed from a tank along a pressure line to an injector, wherein the injector is arranged on an exhaust gas line and is designed to inject the aqueous urea solution into the exhaust gas line. The conveying speed of the pump is controlled depending on the opening operations and closing operations of the injector and/or the pressure conditions resulting therefrom in the conveying section between the pump and the injector.

9 Claims, 2 Drawing Sheets

(52) U.S. Cl.
CPC .......... *F01N 2610/1433* (2013.01); *F01N 2610/144* (2013.01); *F01N 2610/1446* (2013.01); *F01N 2610/1453* (2013.01); *F01N 2610/146* (2013.01); *F01N 2900/04* (2013.01); *F01N 2900/18* (2013.01); *F01N 2900/1806* (2013.01); *F01N 2900/1808* (2013.01); *F01N 2900/1821* (2013.01); *F01N 2900/1822* (2013.01)

(56) References Cited

U.S. PATENT DOCUMENTS

| | | | | |
|---|---|---|---|---|
| 10,711,676 | B2 * | 7/2020 | Sundar | F01N 11/00 |
| 10,753,254 | B2 * | 8/2020 | Lorenz | F01N 3/208 |
| 10,844,768 | B2 * | 11/2020 | Takemoto | F01N 3/208 |
| 10,900,401 | B2 * | 1/2021 | Braeuer | F01N 3/208 |
| 11,060,951 | B2 * | 7/2021 | Takaoka | G01M 15/09 |
| 11,306,639 | B2 * | 4/2022 | Sundararajan | F01N 9/00 |

FOREIGN PATENT DOCUMENTS

| | | |
|---|---|---|
| DE | 112010002738 | 1/2013 |
| DE | 102015203437 | 6/2016 |
| DE | 102016118454 | 4/2017 |
| DE | 102018129351 | 6/2019 |

\* cited by examiner

METHOD FOR ADAPTING THE VOLUME FLOW

CROSS REFERENCE TO RELATED APPLICATIONS

This is a U.S. national stage of Application No. PCT/EP2021/077461 filed Oct. 5, 2021. Priority is claimed on German Application No. DE 10 2020 212 961.4 filed Oct. 14, 2020 the content of which is incorporated herein by reference.

BACKGROUND OF THE INVENTION

1. Field of the Invention

The disclosure relates to a method for operating a conveying device for an aqueous urea solution in a motor vehicle, having a pump for conveying the aqueous urea solution, wherein the aqueous urea solution is conveyed from a tank along a pressure line to an injector, wherein the injector is arranged on an exhaust gas line and is designed to inject the aqueous urea solution into the exhaust gas line, wherein the conveying speed of the pump is controlled depending on the opening operations and closing operations of the injector and/or the pressure conditions resulting therefrom in the conveying section between the pump and the injector.

2. Description of Related Art

In many countries all around the world, legal regulations have been made that define an upper limiting value for the content of specific substances in the exhaust gas from internal combustion engines. These are mostly substances of which the discharge into the environment is undesirable. One of these substances is represented by nitrogen oxide (NOx), of which the proportion in the exhaust gas must not exceed legally defined limiting values. Because of the boundary conditions, for example the design of the internal combustion engine with a view to beneficial consumption and the like, the internal engine avoidance of the nitrous oxide emissions when reducing the proportion of the nitrogen oxides in the exhaust gas is possible only to a limited extent, so that exhaust gas post-treatment is necessary to comply with relatively low limiting values. Here, it has transpired that selective catalytic reduction (SCR) of the nitrous oxides is advantageous. These SCR methods need a reducing agent which contains nitrogen. In particular, the use of ammonia ($NH_3$) as a reducing agent has emerged as a possible alternative. Because of the chemical properties and the legal provisions in many countries, the ammonia is usually not kept as pure ammonia, since this can lead to problems in particular in motor vehicles or other mobile applications. Rather, instead of storing the reducing agent itself, reducing-agent precursors are often stored and carried along A reducing-agent precursor is to be understood to mean in particular a substance which splits off the reducing agent or which can be converted chemically into the reducing agent. For example, urea represents a reducing-agent precursor for the reducing agent ammonia.

The aqueous ammonia solution, the urea, is carried along in a tank and conveyed into the exhaust gas line in accurately metered quantities by a suitable conveying device. The conveying device for this purpose routinely has, amongst other things, a pump for conveying the fluid, one or more filters for purifying the fluid, optionally heating devices for thawing the fluid, and a control device for processing internal and external data and for actuating the pump, the heating devices and further controllable components, such as the injector for example.

A disadvantage of the prior art devices is in particular that the durability of the injector is no longer ensured sufficiently, since it is exposed to increasing loads by way of increased injection frequencies and the increasing reducing agent demand for exhaust gas post-treatment.

SUMMARY OF THE INVENTION

It is therefore an object of one aspect of the present invention to create a method for operating a conveying device and an injector that makes it possible to feed the correct and necessary amount of reducing agent into the exhaust gas line and at the same time to reduce the load on the injector, in order to provide a longer durability.

One exemplary aspect of the invention relates to a method for operating a conveying device for an aqueous urea solution in a motor vehicle, having a pump for conveying the aqueous urea solution, wherein the aqueous urea solution is conveyed from a tank along a pressure line to an injector, wherein the injector is arranged on an exhaust gas line and is designed to inject the aqueous urea solution into the exhaust gas line, wherein the conveying speed of the pump is controlled depending on the opening operations and closing operations of the injector and/or the pressure conditions resulting therefrom in the conveying section between the pump and the injector.

To increase durability, it is preferred if the opening frequency is reduced. It is advantageous in particular if the opening frequency lies at approximately one to four Hertz. This entails the disadvantage that the opening duration of the injectors must be longer, correspondingly, in order to nevertheless convey the same or even a greater volume. This results in a pressure drop within the pressure line. The conveying device has in principle a pressure controller that functions according to the principle of a PID controller. In a device known from the prior art, such a pressure drop within the pressure line would be compensated for by the PID controller. Controllers of this kind, however, have a sluggishness, whereby it is not possible to compensate for the produced pressure drop quickly enough or precisely enough. With use of the PID controller, there is thus an overcompensation of the pressure drop and a so-called overshoot. In this way, pressure pulses are generated within the pressure line which on the one hand hinder the conveying of the correct required conveying volume, and on the other hand may lead to damage to the pump stage. The method according to the invention therefore attempts to allow a compensation of the pressure drop without allowing harmful pressure pulses to form.

The pump is thus preferably not manipulated exclusively by the control by a controller that records and evaluates measurement values and sends corresponding signals to the pump. In particular, with use of a PID controller, the I components and the D components of the controller in the knowledge of the opening times are adapted optimally in order to keep the resultant instability, that is to say the fluctuations, in the system as low as possible. The pump, or the speed of the pump, is additionally changed by a specified value that is dependent on the used system, for example the length of the pressure line, the used injector or the rigidity of the pressure line. The cooperation of the two types to influence the speed of the pump on the one hand by the controller, or the adaptation of the control components, and on the other hand by the specified value depending on the opening/closing of the injector or the pressure makes it possible to produce very stable pressure conditions in the system and to reduce the pressure fluctuations.

The specified value to increase the speed can be an individual value. Alternatively, it can be formed by a value curve or from a map, which has value band for different operating states.

This has the advantage that the pump speed can be adapted dynamically since the dead time disappears on account of the control path of the controller and furthermore the overshoot of the pressure created when closing the injector and the undershoot of the pressure, created when opening the injector can be reduced.

The opening operations or the opening times can be stored in a map for example in the control device of the injector and are thus known. The pressure conditions in the pressure line can be detected for example via a sensor.

The pump preferably conveys the fluid continuously from the tank into the pressure line. This happens also when the injector is closed. By performing a conveying operation with the injector closed, the system pressure is maintained in particular in the pressure line directly before the injector. By way of a foreseeable bypass circuit, the fluid is conveyed back into the tank again, provided the injector remains closed, and there is not injected into the exhaust gas line. A constant system pressure is thus maintained by a preselected speed of the pump. During operation, the pump is operated continuously at this preselected speed. The pressure fluctuations by the opening and closing of the injector are compensated for or minimized by the adaptation according to one aspect of the invention of the speed of the pump.

It is particularly advantageous if the speed of the pump and thus the conveying volume per unit of time is coupled to the opening operations of the injector. Coupling to the opening operation is advantageous since the pressure fluctuation, in particular the pressure drop, in the pressure line is caused by the opening process.

The speed of the pump and thus the conveying volume is substantially synchronized per unit of time with the opening and closing operations of the injector. In the event of an active opening operation, for example the speed is increased in order to increase the pressure in the pressure line temporarily. In this way, the pressure drop created by the opening is compensated for, whereby in particular it can also be ensured that the conveying volume required for exhaust gas post-treatment can also be provided in the available opening time of the injector.

In principle, the speed of the pump during an opening interval of the injector can also be increased, in order to convey the correct conveying volume independently of possible pressure fluctuations. If the system is started for example after a cold start from an idle state, in which the pump is stopped, a pressure build-up phase follows, in which fluid is conveyed from the tank into the pressure line in order to build up a predefined system pressure. Reaching this system pressure is the basic condition that it is possible to start metering the fluid via the injector into the exhaust gas line. It is also conceivable that the pump is in an idle mode prior to the opening of the injector and is operated at a speed that is sufficient to maintain a certain minimum pressure in the pressure line, but not to provide the required conveying volume.

According to one aspect of the invention, the speed of the pump starting from the regular level, which would be sufficient in a system not according to the invention in order to convey the correct conveying volume, is additionally increased in order to furthermore also compensate for the pressure drop created by the opening of the injector.

It is also advantageous if, just before the opening of the injector, at the same time as the opening of the injector, or just after the opening of the injector, the speed of the pump is increased. The speed of the pump can increase temporally before the actual opening operation of the injector, if the opening time is known. Alternatively, the increase can occur at the same time as the opening of the injector or even with a time delay after the opening.

A preferred exemplary aspect of the invention is characterized in that the pressure level within the pressure line is detected from the conveying device to the injector, wherein the speed of the pump is increased depending on the detection of a pressure drop. The pressure level in the pressure line is a direct indicator that makes it possible to draw a conclusion as to the opening state of the injector. A pressure drop is recorded directly during or after the opening of the injector. As soon as such a pressure drop is identified, this pressure drop can be counteracted by an increase of the speed.

It is also preferred if the current with which the injector is energized for the purpose of opening is detected, wherein the speed of the pump is increased depending on the strength of the current applied to the injector.

Values of the current of one ampere are a certain sign for a fully open injector. By increasing the current approximately from the starting level of zero amperes, the start of the opening operation can be detected accurately.

In addition, it is advantageous if the speed of the pump during the time over which the injector is open is independent of the conveying volume required for exhaust gas post-treatment. This is expressed in that, according to one aspect of the invention, the speed of the pump is increased to a level above the speed of the pump that would be necessary to convey the required volume. The speed of the pump when the injector is open is oriented towards the so-called static injector flow, which is a variable known by the hardware, i.e. the set-up, of the injector and is known for the injector used. The speed of the pump is thus held at a level which is sufficient to convey the static injector flow. The static injector flow corresponds to the flow through the injector when this is not fully open.

It is furthermore advantageous if the speed of the pump, which is increased whilst the injector is open, is reduced again as soon as a closing operation of the injector is identified, shortly before the injector is closed, or with a defined delay relative to the closing operation of the injector.

It is also expedient if a plurality of injectors is provided, wherein the volume flow conveyed by the pump, during an opening of an injector or a plurality of injectors, is increased for each of the opened injectors by a volume flow specific to the injector in question.

The method according to the invention is also usable for devices having two injectors. The increase of the speed to compensate for the pressure drop is designed here accordingly in such a way that the pressure drop is compensated in both pressure lines and in each case in a manner suitable for the opening operation of the injector in question.

An advantage of the method according to one aspect of the invention is in particular a constant pressure level within the pressure line alongside protection of the injectors by a lower opening frequency. Due to the constant pressure or the smaller pressure fluctuations, it is ensured that the spray cone of the injector is constant and corresponds at all times to the original design. By way of a pressure drop, the spray cone produced by the injector within the exhaust gas line is not correctly formed, and therefore the conversion of the aqueous urea solution and thus also the exhaust gas post-treatment would be worsened on the whole.

In addition, the metering accuracy of the conveying device is improved, since large pressure fluctuations in the pressure line or at the pump are absent. Furthermore, a quicker adaptation of the speed is achieved by increasing the speed by a specified value instead of an active control member.

Advantageous refinements of the present invention are described in the dependent claims and in the following description of the figures.

BRIEF DESCRIPTION OF THE DRAWINGS

The invention is further explained below with reference to a drawing, In the drawing.

DETAILED DESCRIPTION OF THE PRESENTLY PREFERRED EMBODIMENTS

Figure 1:
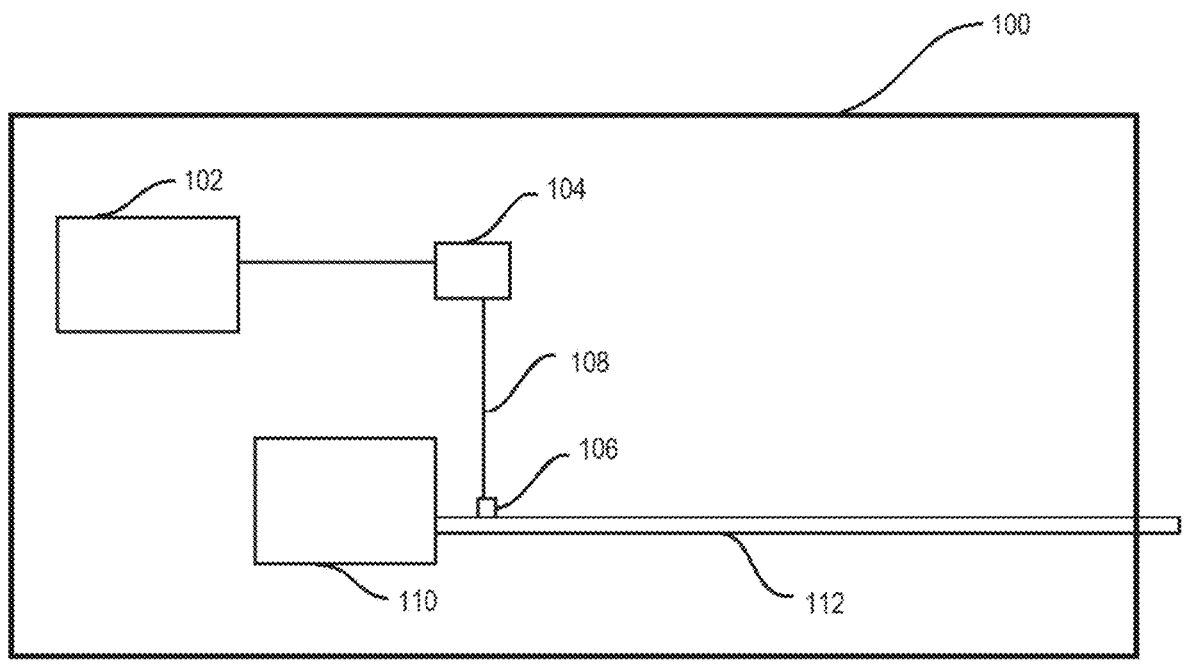
FIG. 1 is a schematic representation of a vehicle.

FIG. 1 is a schematic representation of a vehicle that embodies one aspect of the method for operating a conveying device for an aqueous urea solution in a motor vehicle 100, having an internal combustion engine 102, a pump 104 for conveying the aqueous urea solution, wherein the aqueous urea solution is conveyed from a tank 102 along a pressure line 108 to an injector 106. The injector 106 is arranged on an exhaust gas line 112 and is designed to inject the aqueous urea solution into the exhaust gas line 112. The conveying speed of the pump 104 is controlled depending on the opening operations and closing operations of the injector 106 and/or the pressure conditions resulting therefrom in the conveying section 108 between the pump and the injector.

Figure 2:
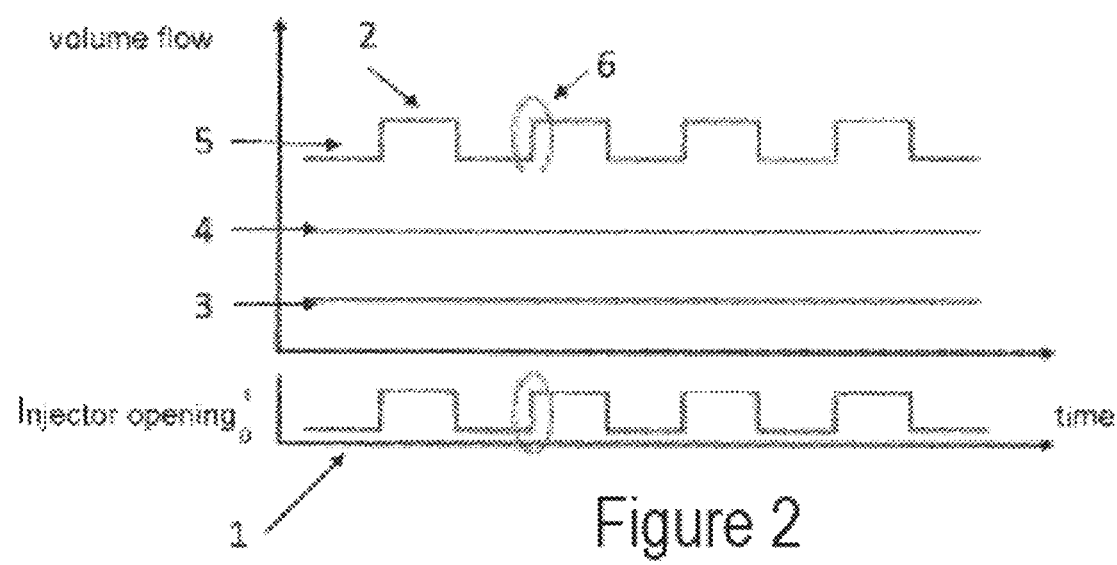
FIG. 2 is a graph illustrating the volume flow conveyed by the conveying device with use of the method according to the invention.

FIG. 2 shows a graph that specifies the state of the injector in the lower part 1. State "0" denotes the closed injector, and state "1" denotes the open injector. The time is plotted along the X axis, and a plurality of opening operations and closing operations are shown.

In addition, a graph 2 is shown, which likewise shows the time on the X axis, wherein the volume flow of the aqueous urea solution which is conveyed by the pump is plotted along the Y axis. The volume flow is composed of different partial volume flows 3, 4, which in part remain constant over time.

The uppermost component 5 of the volume shows the volume flow, which is conveyed additionally by the pump depending on the opening state of the injector. The component which is conveyed additionally at the time of opening of the injector (state of the injector changes from "0" to "1") by the increase of the pump speed is denoted by reference sign 6. This component 6 is not constant over the course of time, but is increased in a temporally delimited manner in accordance with the opening and the closing of the injector.

The volume flow consisting of the partial volume flows 3, 4 and the component of the volume flow 5 when the injector is closed corresponds to the normally required volume flow in order to convey the required amount of aqueous urea solution. The component denoted by reference sign 6 corresponds to the volume flow that is additionally required by the increase according to the invention of the speed of the pump.

Lastly, the required amount of aqueous urea solution is injected by the injector into the exhaust gas line or the exhaust gas tract, and substantially only the pressure fluctuation in the pressure line is counteracted by the temporary increase of the volume flow through the pump.

The Figures are in particular not of a limiting nature, and serve for illustrating the concept of the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a conveying device for an aqueous urea solution in a motor vehicle, having a pump configured to convey the aqueous urea solution, conveying the aqueous urea solution from a tank along a pressure line to an injector;

arranging the injector on an exhaust gas line;

injecting the aqueous urea solution into the exhaust gas line; and controlling a conveying speed of the pump depending on opening operations and closing operations of an injector and/or pressure condition resulting therefrom in a conveying section between the pump and the injector.

2. The method as claimed in claim 1, wherein a speed of the pump and thus a conveying volume per unit of time is coupled to the opening operations of the injector.

3. The method as claimed in claim 2, wherein, just before opening of the injector, at a same time as the opening of the injector, or just after the opening of the injector, the speed of the pump is increased.

4. The method as claimed in claim 1, wherein a pressure level within the pressure line is detected from the conveying device to the injector, wherein the conveying speed of the pump is increased depending on a detection of a pressure drop.

5. The method as claimed in claim 1, wherein a current with which the injector is energized for opening is detected, wherein the conveying speed of the pump is increased depending on a strength of the current applied to the injector.

6. The method as claimed in claim 1, wherein the conveying speed of the pump during a time over which the injector is open is independent of a conveying volume required for exhaust gas post-treatment.

7. The method as claimed in claim 1, wherein the conveying speed of the pump, which is increased whilst the injector is open, is reduced again as soon as a closing operation of the injector is identified, shortly before the injector is closed, or with a defined delay relative to the closing operation of the injector.

8. The method as claimed in claim 1, wherein a plurality of injectors are provided, wherein a volume flow conveyed by the pump, during an opening of an injector or a plurality of injectors, is increased for each of the opened injectors by a volume flow specific to each respective injector.

9. The method as claimed in claim 1, wherein a constant pressure level is maintained within the pressure line based at least in part on an opening frequency of the injector.

\* \* \* \* \*